UNITED STATES PATENT OFFICE.

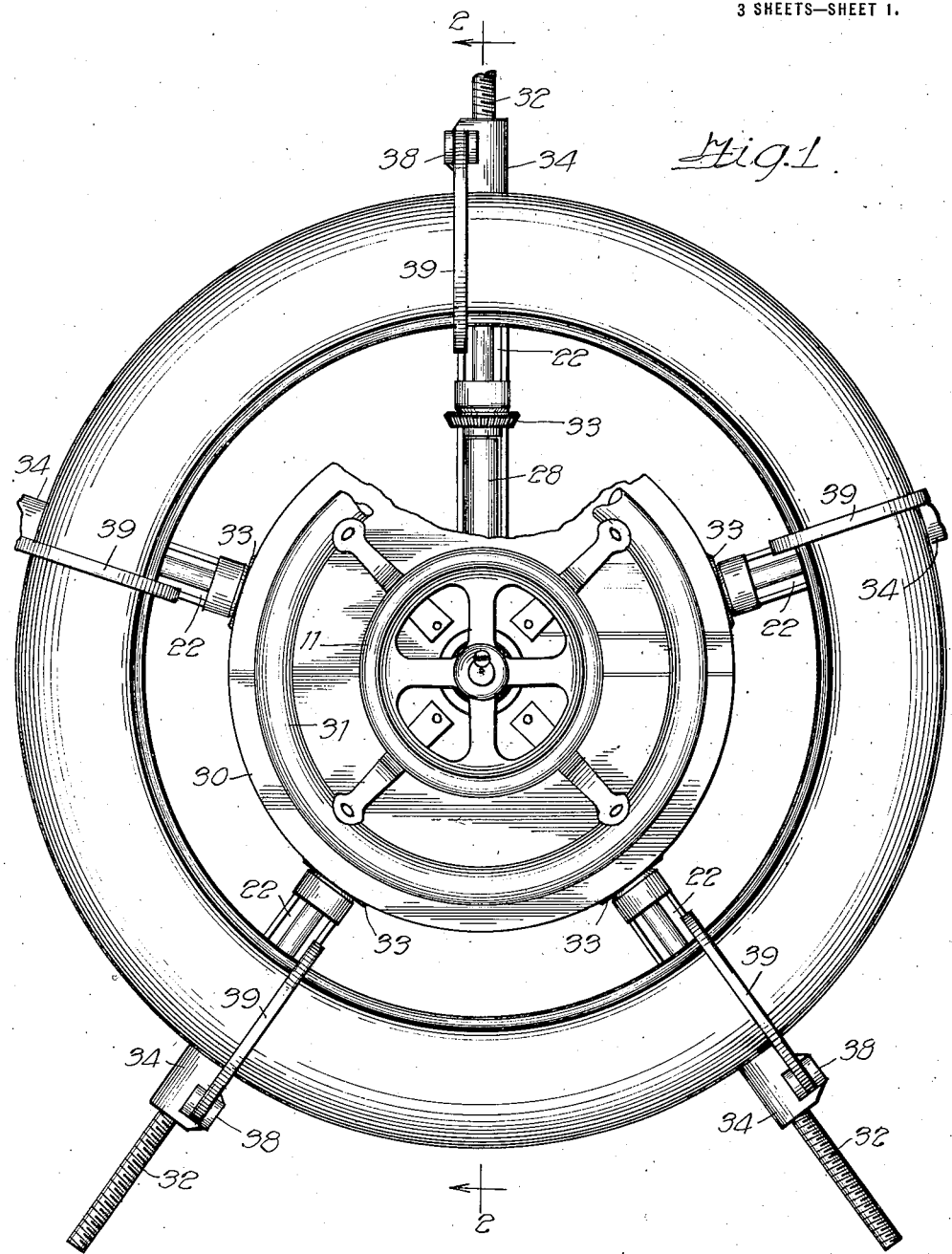

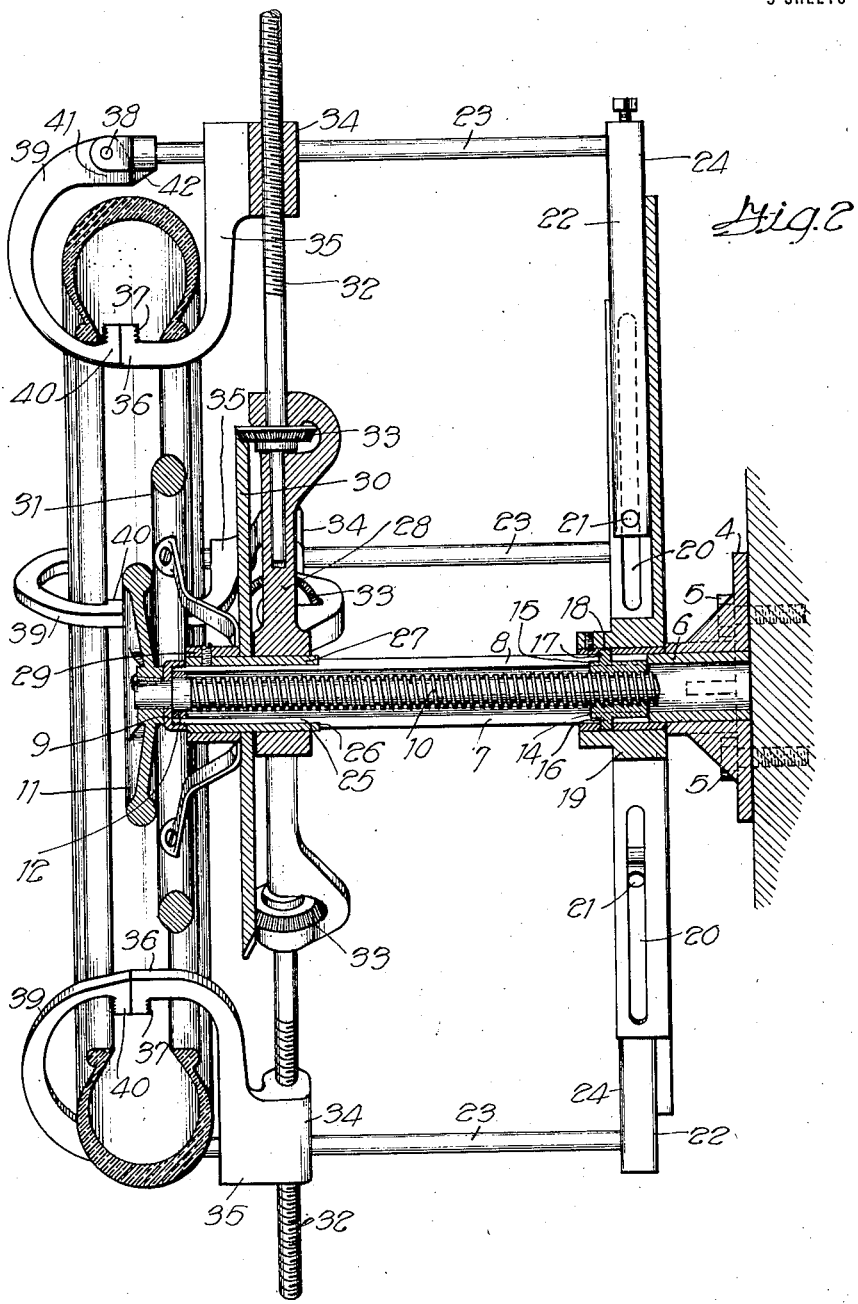

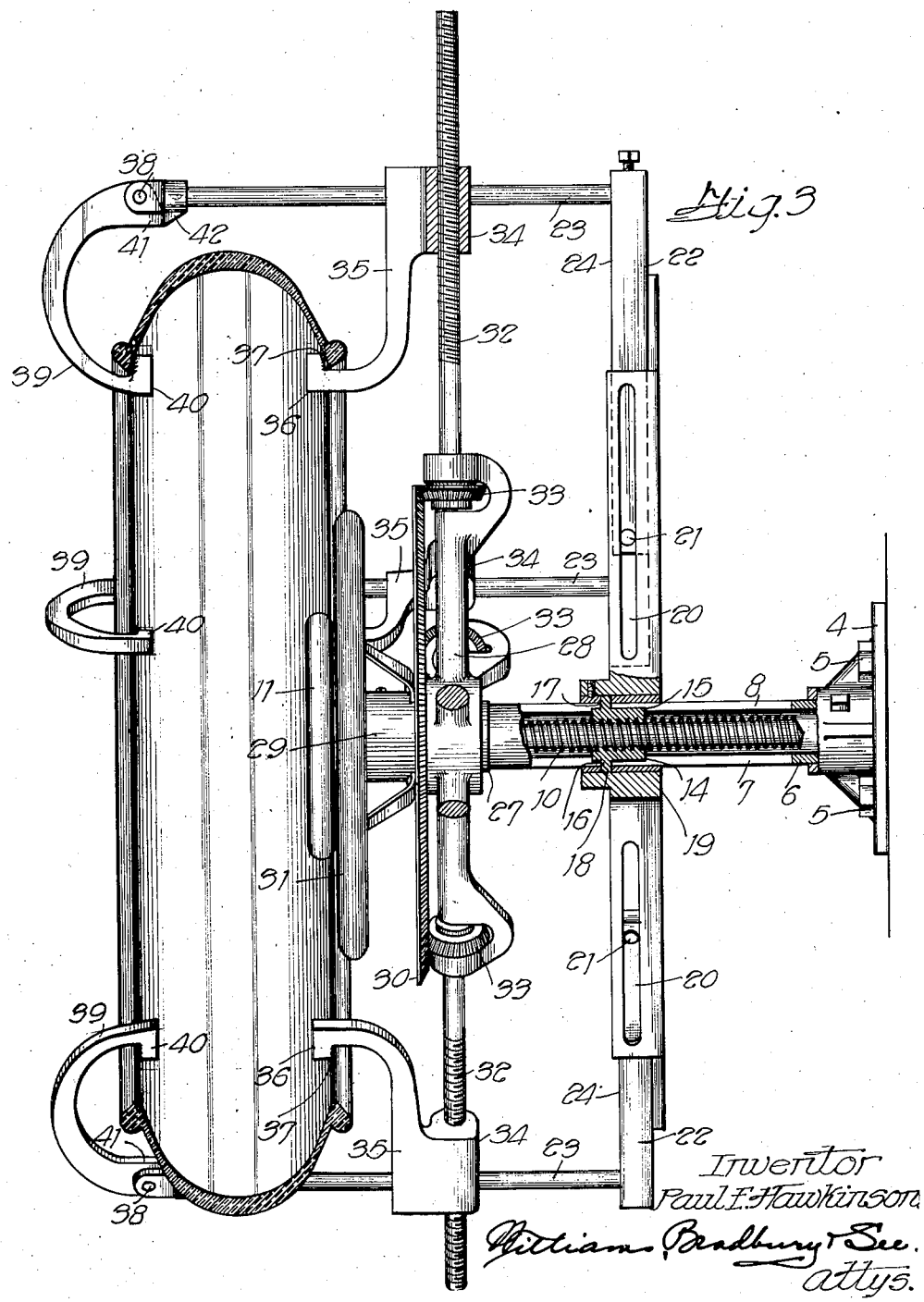

PAUL E. HAWKINSON, OF MINNEAPOLIS, MINNESOTA, ASSIGNOR, BY MESNE ASSIGNMETS, TO KEHAWKE MFG. CO., OF MINNEAPOLIS, MINNESOTA, A CORPORATION OF MINNESOTA.

TIRE-CASING SPREADER.

1,352,807.

Specification of Letters Patent. Patented Sept. 14, 1920.

Application filed October 29, 1919. Serial No. 334,274.

*To all whom it may concern:*

Be it known that I, PAUL E. HAWKINSON, a citizen of the United States, residing at Minneapolis, in the county of Hennepin and State of Minnesota, have invented a certain new and useful Improvement in Tire-Casing Spreaders, of which the following is a full, clear, concise, and exact description, reference being had to the accompanying drawings, forming a part of this specification.

My invention relates to tire casing spreaders and has for its general object the provision of improved means for spreading pneumatic tire casings to facilitate the work of inspecting, repairing or rebuilding the casings.

More specifically the objects of the present invention reside in the provision of a tire casing spreader having greater general efficiency, simplicity of construction and durability than that disclosed in my co-pending application, Serial No. 295,425, filed May 7, 1919.

These and other objects of the present invention will be pointed out in detail in connection with the accompanying drawings in which—

Figure 1 is a front elevation view of the device of my invention.

Fig. 2 is a vertical cross-sectional view taken along the line 2—2 of Fig. 1, looking in the direction indicated by the arrows; and Fig. 3 is a view partly in elevation and partly in section showing the device in operating position, with the tire casing mounted thereon spread so that the interior of the casing is accessible for inspection or repair.

Similar characters of reference refer to similar parts throughout the several views.

Referring first to Fig. 2, 4 designates a support or bracket adapted for attachment to a wall or any suitable supporting member. This bracket or support may be clamped to the wall in any convenient manner, as for example by bolts as shown at 5—5. Rigidly secured to the bracket or support 4 and extending horizontally therefrom, is a sleeve 6 slotted at 7 and 8, said slots, extending from a point near the inner end of the sleeve to the outer end thereof. Disposed longitudinally within the sleeve 6 and held against longitudinal movement relatively thereto by means of a cap 9, is a screw 10, the outer end of which carries an operating hand wheel shown at 11. The cap 9 is screw threaded onto the end of the sleeve 6 and fits between the collar 12 and the operating hand wheel 11 for the purpose of preventing longitudinal movement of the screw 10 relatively to the sleeve.

Coöperating with the screw 10 is a nut 13, carrying lugs or extensions 14 and 15 fitting in the slots 7 and 8, respectively. Forming a part of the nut 13 and extending outwardly beyond the lugs or extensions 14 and 15, are two pins 16 and 17 fitting in an annular groove 18, provided in a spider 19, mounted for rotative and longitudinal movement on the sleeve 6. In the preferred form of the invention this spider comprises five arms each of which is channeled as most clearly shown in Figs. 1 and 2, the side walls of the channel being slotted as shown at 20 for the reception of pins 21—21 carried by the arms 22—22. Each one of the arms 22 is preferably constructed of two parts 23 and 24, rigidly held together in any suitable manner.

Each one of the bars 24 forming part of an arm 22 is arranged for longitudinal movement within its channel for the purpose of permitting the arms 22 to move toward and away from the sleeve 6 and thus for adjusting the device to fit tires of different sizes as will be described hereinafter. The outer end of the sleeve 6 is reduced as shown at 25 to provide an annular shoulder 26 and around this reduced portion is disposed a sleeve 27 held against longitudinal movement relatively to the sleeve 6 by the annular shoulder 26 and the cap 9.

Rigidly secured to the sleeve 27 in any suitable manner is a second spider 28 and a collar 29, the collar and spider being longitudinally spaced on the sleeve 27 and between the collar and sleeve is interposed a bevel gear 30, carrying an operating wheel 31 extending outwardly from the bevel gear. The bevel gear 30 is mounted for rotation on the sleeve 27 and the spider 28 together with the sleeve 27 is mounted for rotation on the sleeve 6.

The spider 28 is provided with the same number of arms as is the inner spider 19, namely five, and each arm journals a screw 32 rigidly fixed to a bevel pinion 33 meshing with the bevel gear 30, as most clearly shown in Figs. 2 and 3. Longitudinal movement of the several screws 32—32 is prevented by shaping the spider arms as shown and by pinning the several bevel pinions to the screws.

The outer end of each one of the screws 32 extends through a nut 34 forming part of an arm 35 having a tire edge engaging finger or hook 36 which, if desired, may be serrated or toothed as shown at 37.

Each one of the rods 23 forming the outer ends of arms 22 passes through one of the arms 35 and is arranged for longitudinal movement with respect thereto. Pivoted to the outer end of each one of the rods 23 at 38 is a curved arm 39, the inner end of which carries the tire edge engaging finger or hook 40 which may be serrated as shown. The inner or pivoted end of the curved arm 39 carries a stop 41 adapted for coöperation with a second stop 42 fixed to the rod 23. This stop arrangement limits the inward swinging movement of the curved arm.

The operation of the device is as follows:

In placing a tire on the device, the arms 22—22 are first moved inwardly toward the axis of the sleeve 6 to a position where the arms 35—35 may receive the tire to be spread. The inward and outward movement of the arms 22—22 is accomplished by turning the hand wheel 31. When the arms 22—22 assume the correct position for receiving the tire, each one of the curved arms 39 is swung outwardly and the tire placed around the hooked ends of the several arms 35. Each one of the arms 39—39 is then swung inwardly to the position shown in Fig. 2 and the hand wheel 31 manipulated until the several arms 22 assume positions where the fingers 36 and 40 extend between the edges of the tire casing.

The hand wheel 11 is then operated in a clockwise direction and due to the nut and pin connection between the screw 10 and the inner spider 19, the spider is moved outwardly away from the support 4. The outward movement of the spider results in a corresponding outward movement of the rods 23 and the several curved arms 39 carried thereby. The rotation of the hand wheel 11 is continued until the parts assume positions substantially as shown in Fig. 3, when the tire casing is spread and the interior thereof is easily accessible for repair or inspection.

In removing the tire, the same procedure is followed except that it is reversed.

It will be observed that the mechanism for spreading the edges of the tire is such as to move the several arms 39 outwardly and not the arms 35 inwardly with the result that the spread tire lies in a position outside of the operating hand wheels 11 and 31 and the interior of the tire casing is readily accessible. This would not be true if the arms 39 remained stationary and the arms 35 moved inwardly during the spreading operation of the machine.

By mounting the several screws 32—32 on the spider 28 in a manner so as to prevent longitudinal movement of the screws relatively to the spider and by extending the several screws through the nuts 34, it is possible to construct the screws of any desired length and thereby to fit the machine to any size tire. The several arms 35 and 39 may be moved to fit any tire simply by turning the hand wheel 31 as hereinbefore described.

Attention is also directed to the fact that the entire mechanism including the spider 19 and parts carried thereby, spider 28 and parts carried thereby and the bevel gear 30 and operating hand wheel 31 may be rotated around the fixed sleeve 6.

This construction makes it possible for the workman to rotate the entire device around a fixed axis and thus enable him to move the tire to that position which is most convenient for him.

Having thus described my invention, what I claim as new and desire to secure by Letters Patent of the United States is:

1. In a tire casing spreader, the combination with a plurality of pairs of members disposed in circular arrangement adapted to engage the edges of a tire casing, said members all mounted for movement around a horizontal axis, means arranged when operated to move all of said members in straight lines radial to the axis of their rotation, and means arranged when operated to move one of the engaging members of each pair in a straight line parallel to the said axis of rotation.

2. In a tire casing spreader, the combinatiin with a base adapted to be secured to a wall or other support, a plurality of arms projecting horizontally forwardly from said base, each of said arms provided at its free end with a member adapted to engage the forward edge of a tire casing disposed in a vertical plane in front of said base, each of said arms provided with a second member adapted to engage the rear edge of said tire casing, and means arranged, when operated, to move said arms and all of said engaging members in straight lines radial to a common center.

3. An apparatus of the class described comprising in combination a support, and a plurality of horizontally disposed arms projecting therefrom, means at the free ends of said arms arranged to engage the forward edge of a tire casing disposed in a vertical plane in front of said base, means arranged, when operated, to move all of said arms in straight lines radial to a common center, members movably mounted on said arms arranged to engage the rear edge of said casing, and means arranged, when operated, to move all of said last-mentioned engaging members longitudinally of their respective horizontal arms.

4. In a tire casing spreader the combination of a plurality of members arranged in a circle and adapted to engage the edges of a tire casing, and means for imparting rectilinear movement to said members toward or away from the center of the circle.

5. An apparatus of the class described, comprising a base adapted to be secured to a wall or other vertical surface, a plurality of hooks adapted to lie around and engage the edge of a tire casing disposed in a vertical plane in front of said base, a second set of hooks arranged to engage the other edge of the tire casing, being the edge of the casing nearer the base, means for mounting said hooks on said base for movement around a horizontal axis and means located at said axis and accessible through the casing carried by said hooks arranged when operated to move one set of hooks horizontally away from the other set of hooks to spread open the casing.

6. In a tire casing spreader the combination of a plurality of pairs of members adapted to engage the edges of a tire casing, and means for imparting rectilinear movement to said members for the purpose of positioning the same for any sized tire.

7. In a tire casing spreader, the combination of a plurality of pairs of tire engaging members arranged in a circle, a support for said members centrally disposed within the members, a. hand wheel and coöperating mechanism for moving said members toward and away from the support, and a second hand wheel and coöperating mechanism for separating the members of each pair, said wheels being co-axially mounted and disposed within said members.

8. In an apparatus of the class described, the combination of a support adapted to be carried by a wall or the like, two sets of hooks carried by said support and disposed in circular arrangement, the hooks of one set adapted to engage one edge of a tire casing disposed in a vertical plane in front of said support, the hooks of the other set being adapted to engage the other edge of the casing, said hooks being mounted on said support for rotation around a substantially horizontal axis, means arranged, when operated, to move said hooks toward and from the axis aforesaid, a manually operated actuating device for said last-mentioned means, means arranged, when operated, to move one set of hooks away from the other set of hooks to spread open the casing, a manually operated actuating device for said last-mentiond means, both of said manually operated actuating devices being located at the axis afore- said and being accessible to a workman through the central opening in the casing carried by said hooks.

9. In a tire casing spreader the combination of a horizontally disposed sleeve, a screw co-axially mounted within the sleeve, means for operating said screw, a nut coöperating with the screw, a plurality of pairs of tire engaging members supported by the sleeve, and means connecting the nut and one member of each of said pairs for separating the members of each pair when said screw is operated.

10. In a tire casing spreader, the combination of a support, a plurality of screws radiating therefrom, a pinion fixed to each screw, a gear meshing with said pinions and rotatably mounted on the support, means for rotating the gear, a plurality of pairs of tire engaging members spaced around the support, a nut attached to each of said pairs and coöperating with one of said screws, and means for separating the said members of each pair.

11. In a tire casing spreader, the combination of a supporting sleeve, a plurality of pairs of tire engaging members spaced around the sleeve, a screw within the sleeve, a nut coöperating therewith, means connecting one member of each pair with said sleeve and preventing relative longitudinal movement between the member and sleeve, and devices connecting the nut with the other member of each pair for separating the members.

12. In a tire casing spreader the combination of a supporting sleeve provided with a longitudinal slot, a spider rotatably mounted on the outer end of the sleeve, a plurality of screws radiating from the spider, pinions on said screws, a gear rotatably mounted on the sleeve, and meshing with said pinions, means for rotating said gear, a plurality of pairs of tire engaging members spaced around the sleeve, a nut carried by one member of each pair, and coöperating with one of said screws, a screw mounted within the sleeve, a nut coöperating therewith and extending into the slot provided in said sleeve, means for rotating the last mentioned screw, and devices connecting the nut and one of the members of each pair, for separating said members.

13. In a tire casing spreader the combination of a supporting sleeve provided with a longitudinal slot, a spider rotatably mounted on the outer end of the sleeve, a plurality of screws radiating from the spider, pinions on said screws, a gear rotatably mounted on the sleeve and meshing with said pinions, a hand wheel for rotating said gear, a plurality of pairs of tire engaging members spaced around the sleeve, a nut carried by one member of each pair and coöperating with one of said screws, a screw mounted within the sleeve, a nut coöperating therewith and extending into the slot provided in said sleeve, a hand wheel for rotating the last mentioned screw, and devices connecting the nut and one of the members of each pair for separating said members.

14. In a tire casing spreader, the combination of a sleeve provided with a longitudinal slot, a spider rotatably mounted at one end of the sleeve, a plurality of screws radiating from said spider, bevel gear pinions fixed to said screws, a bevel gear meshing with the pinions and rotatably mounted on the sleeve, a hand wheel for rotating the gear, means preventing longitudinal movement of the spider and gear relatively to the sleeve, a plurality of pairs of tire engaging members spaced around the sleeve, a nut carried by one member of each pair and coöperating with one of said screws, a rod attached to the other member of each pair and having a sliding connection with said nut, an operating screw co-axially mounted in the sleeve, a nut coöperating with the screw and extending into the slot provided in the sleeve to prevent relative rotative movement between the sleeve and nut, a second spider having longitudinal movement with said last mentioned nut and having rotative movement on the sleeve, and a radial sliding connection between the last mentioned spider and said rods for permitting adjustment of said tire engaging members and for spreading the same.

In witness whereof, I hereunto subscribe my name this 6th day of October, 1919.

PAUL E. HAWKINSON.

Witnesses:
 MARY SAPIRO,
 T. A. BURKE.